United States Patent Office 3,240,701
Patented Mar. 15, 1966

---

3,240,701
INHIBITING GROWTH OF BACTERIA IN FLUIDS
Thomas E. Furia, Bronxville, N.Y., assignor to Geigy Chemical Corporation, Greenburgh, N.Y., a corporation of Delaware
No Drawing. Filed Aug. 21, 1961, Ser. No. 132,601
15 Claims. (Cl. 252—8.55)

This invention relates to the treatment of fluids, particularly aqueous fluids, such as water injection systems for secondary oil recovery, or cutting fluids which are water-oil emulsions, solutions, etc., or other mixtures of oils, hydrocarbons and water, e.g. jet fuels in contact with water, etc. More particularly, the invention pertains to a novel method for the destruction or inactivation of microorganisms, bacteria, etc. in contact with waters, solutions, emulsions, etc. which are used in oil recovery or in cutting fluids or in jet fuels.

Although it is known to inhibit microorganisms in fluids with the addition of certain compounds, the surprisingly effective use of diethylenetriamine pentaacetic acid and the salts thereof, or 1,2-diaminocyclohexane tetraacetic acid and the salts thereof, for inhibition of microorganisms in fluids has not been known. The compounds of the invention are characterized by a versatility which is extremely useful in the prevention of undesirable bacterial action in fluids having a wide variety of applications.

The invention is also concerned with novel compositions of matter which comprise the microorganism inhibiting compound of the invention, water and a microorganism growth promoting component which may be non-aqueous, such as hydrocarbon or oily material, as well as salts, metallic elements, sulfur, carbon dioxide, etc. These novel compositions of matter are closely related to the specific use for which the microorganism inhibiting compound of the invention is to be applied. Thus, in the case of cutting fluids, the new compositions comprise (a) either diethylenetriamine pentaacetic acid and/or its water soluble salts (e.g. alkali metal salts), or 1,2-diaminocyclohexane tetraacetic acid and/or its water soluble salts (e.g. alkali metal salts), (b) a cutting fluid medium which may be water or a mixture of water and oil or other non-aqueous fluid, and (c) metallic particles suspended in said cutting fluid medium (e.g. iron, steel, copper, aluminum, zinc, magnesium, tin, lead and alloys thereof). In the case of petroleum or mineral oil deposits and recovery thereof with water injection systems, the novel compositions of matter comprise (a) either diethylenetriamine pentaacetic acid and/or its water soluble salts (e.g. alkali metal salts), or 1,2-diaminocyclohexane tetraacetic acid and/or its water soluble salts (e.g. alkali metal salts), (b) water containing microorganisms and (c) petroleum or mineral oil. Finally, in the case of stabilizing jet fuels, particularly jet fuels in storage in contact with metal and water, the novel compositions of matter comprise (a) either diethylenetriamine pentaacetic acid and/or its water soluble salts (e.g. alkali metal salts), or 1,2-diaminocyclohexane tetraacetic acid and/or its water soluble salts (e.g. alkali metal salts), (b) jet fuel in contact with water containing microorganisms, and (c) water containing microorganisms.

In the foregoing and other uses, the presence of bacteria or other microorganisms creates serious problems. Such microorganisms cause the formation of sludge, slime and other materials which tend to clog the small openings through which the particular fluid passes. For example, should the openings in a jet engine be clogged by matter produced by bacteria, a dangerous condition might result which could cause failure of the engine, explosion, loss of life and property. It is essential to prevent the formation of such sludge, etc. in the jet fuel tanks of aircraft. In addition, bacteria may cause the degradation of fuel tank linings (e.g. synthetic rubber), thus causing leakage. Formation of such sludge, etc. in storage tanks causes problems of removal before the jet fuel can be safely used.

One of the most important problems in the formation of stable cutting fluids is the prevention of emulsion degradation, particularly during use for cooling and lubrication of metals during working. Such emulsion degradation is often caused by microbial activity. It is an object of the invention to inhibit or reduce microbial growth which would result in such degradation and consequent interference in the performance of the cutting fluids.

Cutting fluids are used to cool and lubricate the surfaces which are being cut and shaped by the tool or abrasive. Such coolant materials are usually expelled from an orifice onto the surface being cut. If this orifice becomes clogged even for short periods of time, the stoppage of coolant could cause overheating and undesired friction which could interfere seriously with the cutting operation. Prevention of the formation of sludge caused by bacteria or other microorganisms is a particular desideratum of this invention.

In the recovery of mineral or petroleum oil from porous rock formations by forcing aqueous systems into said porous formations, the prevention of clogging the pores of the rocky formations is very important. Clogging is often caused by the action of microbes on inorganic materials found in the oil bearing strata causing the formation of highly insoluble precipitates which clog the pores of the oil bearing rock. Further, microorganisms may cause corrosion of oil well equipment, such as iron pipe casings, etc. Sludge, etc. from bacterial action in the water injection systems could also prevent the recovery of considerable quantities of otherwise available valuable deposits of mineral or petroleum oil.

While the foregoing several uses illustrate the versatility of the invention, it is not intended that such uses or the illustrative examples which follow should be construed as limiting the scope of the invention thereto. On the contrary, the invention extends to the protection of any non-sterile liquid system by the incorporation therein of an effective amount of a compound selected from the group consisting of diethylenetriamine pentaacetic acid, the salts thereof, 1,2-diaminocyclohexane tetraacetic acid and the salts thereof. The great utility of such a method is apparent when it is realized that it is economically impractical to inhibit microbial activity in many fluids, such as those described hereinabove, except in situ, as it were, at the point of use. Thus, in oil recovery systems, the same water can be recirculated many times and only needs sufficient bacteria inhibitor present to be useful.

In general, concentrations of from about 0.001 to about 10% by weight of inhibitor, based on the stabilized composition, are useful, but from about 0.05 to about 0.5% by weight of inhibitor, based on the stabilized composition, are preferred.

In addition to the free acids or the salts thereof of diethylenetriamine pentaacetic acid or of 1,2-diaminocyclohexane tetraacetic acid, certain metal chelates, such as heavy metal chelates, of these compounds may also be successively used for inhibition of microorganisms under certain conditions. The divalent metal chelates, such as the zinc and the copper chelates, are especially useful. In the following discussion, the expression DTPA is used to denote diethylenetriamine pentaacetic acid, while the expression $Na_5DTPA$ means the pentasodium salt of diethylenetriamine pentaacetic acid, and the expression Na₃CuDTPA represents the copper chelate of the trisodium salt DTPA. Similarly, Na₃ZnDTPA indicates the zinc chelate of the trisodium salt of DTPA. Also, the expression CDTA is used to denote 1,2-diaminocyclohexane tetraacetic acid, and the expression Na₂CDTA indicates the disodium salt thereof.

*Example 1*

A cutting fluid composition is stabilized against microbial degradation by incorporation therein of 0.1% by weight of pentasodium diethylenetriamine pentaacetate (Na₅DTPA), said weight percent being based on the total stabilized composition. The unstabilized cutting fluid is a modified commercially available cutting fluid (Lusol, Anderson Oil Co., Portland, Conn.), the modification being the omission of all other additives normally present so that the approximate composition of the cutting fluid is:

| Component— | Weight percent |
|---|---|
| Mineral oil | 10 |
| Emulsifier | 15 |
| Water | 75 |
| Total | 100 |

This unstabilized cutting fluid is mixed with water to produce a final composition having 1 part cutting fluid as above and 24 parts water. The concentration of Na₅DTPA in the final composition is 0.1% by weight, based on the total final composition. The proportions of Lusol (modified) to water of dilution (1:24) are by weight.

A similarly stabilized composition is prepared, except that the final composition contains 0.4% by weight of Na₅DTPA.

A similarly stabilized composition is prepared, except that 0.1% by weight of Na₂CDTA is used in place of the Na₅DTPA.

Other stabilized compositions are similarly prepared as follows:

(1) With 0.4% by weight of Na₂CDTA in the final composition;
(2) With 0.1% by weight of Na₃CuDTPA;
(3) With 0.4% by weight of Na₃CuDTPA;
(4) With 0.1% by weight of Na₃ZnDTPA;
(5) With 0.4% by weight of Na₃ZnDTPA.

Each of the foregoing illustrative compositions of stabilized cutting fluids is used for working metals and said compositions are substantially protected against bacterial or microbial degradation for a period of at least about 60 days. The final cutting fluid compositions are employed in the working of iron, steel, copper, aluminum, zinc, magnesium, tin, lead, etc. The cutting fluids, during use, become mixed with particles of the metal being worked, which particles may range in size from 0.5 micron to 0.25 inch in diameter. The unstabilized cutting fluids contain primarily Pseudomonads and other enteric bacteria.

*Example 2*

Stable final compositions of cutting fluids are prepared exactly the same as each of the illustrative compositions of Example 1, except that instead of the modified cutting fluid concentrate Lusol there is substituted a modified cutting fluid concentrate, commercially available (Stanicool HD, Standard Oil of Indiana) having omitted therefrom all additives except the following: partially sulfurized lard oils, mineral oil, emulsifiers, water.

*Example 3*

A typical water injection system for secondary oil recovery from petroleum oil bearing strata, containing:

| Component— | Weight percent |
|---|---|
| Magnesium sulfate heptahydrate | 0.02 |
| Potassium monohydrogen phosphate | 0.001 |
| Ferrous ammonium sulfate hexahydrate | 0.01 |
| Sodium chloride | 1.0 |
| Water | 98.969 |
| Total | 100.0 | and this unstabilized aqueous system is protected against undesirable microbial activity by incorporation therein of 0.1% by weight of Na₅DTPA, said weight being based on the total stabilized composition.

A similarly stabilized composition contains 0.025% by weight of Na₅DTPA, based on the total composition.

Other stabilized compositions are prepared in a similar fashion to the illustrative composition first mentioned in Example 3, except that the stabilizer and concentration thereof is varied as follows:

(1) With 0.4% by weight (on final composition) of Na₅DTPA;
(2) With 0.4% by weight (on final composition) of Na₃CuDTPA;
(3) With 0.1% by weight (on final composition) of Na₃CuDTPA;
(4) With 0.1% by weight (on final composition) of Na₃ZnDTPA;
(5) With 0.4% by weight (on final composition) of Na₃ZnDTPA;
(6) With 0.4% by weight (on final composition) of Na₂CDTA;
(7) With 0.1% by weight (on final composition) of Na₂CDTA.

In the foregoing illustrative examples, the free acid may be used in place of the sodium salt. Also, in place of the sodium salts, the other alkali metal salts are useful in the same manner: potassium, lithium, etc. Similarly, the alkylamine salts, the alkanolamine salts, e.g. triethanol amine salts, the ammonium salts, etc. are useful as well.

All of the foregoing illustrative final compositions of typical water injection systems for oil recovery are protected against undesirable microbial activity by species of:

Desulfovibrio desulfuricans, Pseudomonas fluorescens, and bacillus cereus.

Undesirable inorganic precipitates and sludge are substantially reduced by the foregoing illustrative stabilizers.

*Example 4*

A typical unstabilized composition, contained in a jet fuel storage tank, has the following composition: 50 parts by volume of JP–4 jet fuel and 50 parts by volume of an aqueous composition having the following proportions:

| Component: | Weight percent |
|---|---|
| Ammonium nitrate | 0.1 |
| Magnesium sulfate | 0.02 |
| Calcium chloride | 0.002 |
| Potassium dihydrogen phosphate | 0.1 |
| Potassium monohydrogen phosphate | 0.1 |
| Ferric chloride | 0.001 |
| Water | 99.677 |
| Total | 100.000 |

This unstabilized composition containing jet fuel and microbes is stabilized against undesirable sludge formation by introducing into the aqueous phase of the mixture 0.1% by weight, based on the aqueous composition, of Na₅DTPA.

A similarly stabilized jet fuel composition contains 0.4% by weight of Na₅DTPA, based on the aqueous composition.

Other stabilized compositions are prepared in a similar fashion to the first mentioned illustrative composition of Example 4, except that the stabilizer and concentration thereof is varied as follows:

(1) With 0.1% by weight (on aqueous phase) of Na₂CDTA;
(2) With 0.1% by weight (on aqueous phase) of DTPA;
(3) With 0.4% by weight (on aqueous phase) of DTPA;
(4) With 0.4% by weight (on aqueous phase) of Na₂CDTA.

The microbes which are found in the unstabilized jet fuel compositions, described hereinabove, are:

Hormodendrum,
Pseudomonads,
Proteus,
Nocardia.

Undesirable sludge formation due to the foregoing microbes in the described jet fuel composition is substantially reduced by the illustrated stabilizers.

*Example 5*

A similar unstabilized jet fuel storage composition is stabilized in the same way as described in Example 4, except that 99 parts by volume of JP-5 jet fuel mixed with 1 part by volume of the aqueous system described in Example 4 is stabilized. Similarly good results are obtained under the same conditions with JP-6 jet fuel in storage.

The chemical structure of DTPA is:

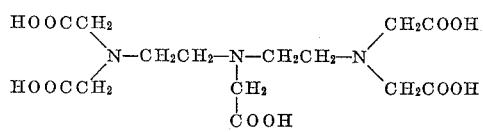

The pentasodium salt of DTPA is assigned the structure:

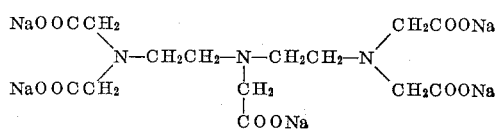

Divalent metal chelates of DTPA have structures, such as:

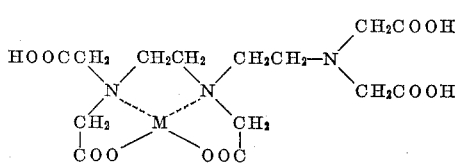

where M signifies the divalent metal ion.

The DTPA compound and its pentasodium salt are commercially available. Other DTPA derivatives are known compounds and are prepared according to conventional methods.

The chemical structure of CDTA is:

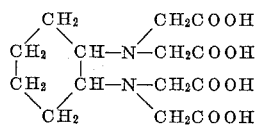

The preparation of CDTA is described in U.S. Patent No. 2,519,708 wherein CDTA is described as 1,2-diaminocyclohexane-N,N'-tetraacetic acid. The simple homologues of CDTA, as described in U.S. Patent No. 2,519,708 are also within the scope of the present invention. Such simple homologues include the alkyl-substituted cyclohexane derivatives related to CDTA.

What is claimed is:

1. The method of inhibiting the detrimental growth of microorganisms in a liquid fluid medium susceptible to such growth, said liquid fluid medium being selected from a group consisting of a water injection system for the recovery of oil from oil bearing strata, a cutting fluid for the working of metal, and a mixture of jet fuel and water in storage, which comprises introducing therein a microorganism growth-inhibiting amount of a compound selected from the group consisting of
    (a) diethylenetriamine pentaacetic acid;
    (b) 1,2-diaminocyclohexane tetraacetic acid;
    (c) a member selected from the group consisting of the alkali metal salts of (a), the alkali metal salts of (b), the ammonium salts of (a), the ammonium salts of (b), the alkylamine salts of (a), the alkylamine salts of (b), the alkanolamine salts of (a), and the alkanolamine salts of (b); and
    (d) a heavy metal chelate selected from the group consisting of the heavy metal chelates of (a), the heavy metal chelates of (b), and the heavy metal chelates of (c).

2. The method of claim 1, wherein said fluid medium is a water injection system for the recovery of oil from oil-bearing strata.

3. The method of claim 1, wherein said fluid medium is a cutting fluid for the working of metal.

4. The method of claim 1, wherein said fluid medium is a mixture of jet fuel and water in storage.

5. The method of stabilizing metal cutting fluid compositions against microbial degradation, which comprises incorporating therein a microbe-growth-inhibiting amount of pentasodium diethylenetriamine pentaacetate.

6. The method of stabilizing metal cutting fluid compositions against microbial degradation, which comprises incorporating therein a microbe-growth-inhibiting amount of a disodium salt of 1,2-diaminocyclohexane tetraacetic acid.

7. The method of stabilizing metal cutting fluid compositions against microbial degradation, which comprises incorporating therein a microbe-growth-inhibiting amount of a copper chelate of trisodium diethylenetriamine pentaacetate.

8. The method of stabilizing metal cutting fluid compositions against microbial degradation, which comprises incorporating therein a microbe-growth-inhibiting amount of a zinc chelate of trisodium diethylenetriamine pentaacetate.

9. The method of stabilizing water injection systems for oil recovery from oil-bearing strata, which comprises incorporating therein a microbe-growth-inhibiting amount of pentasodium diethylenetriamine pentaacetate.

10. The method of stabilizing water injection systems for oil recovery from oil-bearing strata, which comprises incorporating therein a microbe-growth-inhibiting amount of a copper chelate of trisodium diethylenetriamine pentaacetate.

11. The method of stabilizing water injection systems for oil recovery from oil-bearing strata, which comprises incorporating therein a microbe-growth-inhibiting amount of a zinc chelate of trisodium diethylenetriamine pentaacetate.

12. The method of stabilizing water injection systems for oil recovery from oil-bearing strata, which comprises incorporating therein a microbe-growth-inhibiting amount of a disodium salt of 1,2-diaminocyclohexane tetraacetic acid.

13. The method of stabilizing a mixture of jet fuel and water against sludge formation due to microbial activity of microorganisms contained in said mixture, which comprises incorporating therein a microbe-growth-inhibiting amount of pentasodium diethylenetriamine pentaacetate.

14. The method of stabilizing a mixture of jet fuel and water against sludge formation due to microbial activity of microorganisms contained in said mixture, which comprises incorporating therein a microbe-growth-inhibiting amount of a disodium salt of 1,2-diaminocyclohexane tetraacetic acid.

15. The method of stabilizing a mixture of jet fuel and water against sludge formation due to microbial activity of microorganisms contained in said mixture, which comprises incorporating therein a microbe-growth-inhibiting amount of diethylenetriamine pentaacetic acid.

References Cited by the Examiner

UNITED STATES PATENTS

| | | | |
|---|---|---|---|
| 2,407,645 | 9/1946 | Bersworth | 260—534 |
| 2,519,708 | 8/1950 | Schlapfer et al. | 260—514 |
| 2,668,146 | 2/1954 | Cafcas et al. | 252—33.3 |
| 2,828,323 | 3/1958 | De Groote et al. | 252—8.55 |
| 2,830,019 | 4/1958 | Fields et al. | 252—51.5 |
| 2,843,545 | 7/1958 | Wolf | 252—8.55 |
| 2,901,335 | 8/1959 | Fields et al. | 44—71 |
| 2,952,581 | 9/1960 | Wright | 167—30 |
| 3,044,864 | 7/1962 | Ryder | 44—71 |
| 3,099,521 | 7/1963 | Arensberg | 252—8.55 |

OTHER REFERENCES

Sequestrene, published by Geigy Industrial Chemicals, Division of Geigy Chemical Corp., New York, N.Y., 1952, pages 1, 2 and 25.

Martell et al.: Chemistry of the Chelate Compounds, 1956 ed., pub. by Prentice-Hall Inc., N.J., pages 499, 504 and 511.

JULIUS GREENWALD, *Primary Examiner.*